United States Patent [19]

Nocifora et al.

[11] Patent Number: 5,851,066
[45] Date of Patent: Dec. 22, 1998

[54] FLOATING MIXER

[75] Inventors: Frank Nocifora, Rockford; Charles E. Kruse, Roscoe, both of Ill.

[73] Assignee: Aerators, Inc., Roscoe, Ill.

[21] Appl. No.: 924,074

[22] Filed: Aug. 28, 1997

[51] Int. Cl.$^6$ ................................. B01F 5/10; B01F 5/12
[52] U.S. Cl. .......................................... 366/270; 366/262
[58] Field of Search ...................... 366/262, 263, 366/264, 265, 270; 210/242.1, 242.2; 261/91, 92

[56] References Cited

U.S. PATENT DOCUMENTS

| | | | |
|---|---|---|---|
| 3,810,546 | 5/1974 | Oxenham | 261/91 |
| 3,856,272 | 12/1974 | Ravitts | 261/91 |
| 4,422,771 | 12/1983 | Earhart et al. | 366/251 |
| 4,723,848 | 2/1988 | Knight | 366/270 |
| 4,733,972 | 3/1988 | Weis | 366/270 |
| 4,871,488 | 10/1989 | Dobryakov et al. | 366/270 |
| 5,021,154 | 6/1991 | Hageman | 261/91 |
| 5,110,510 | 5/1992 | Norcross | 261/91 |

FOREIGN PATENT DOCUMENTS 1 428 349   10/1974   United Kingdom .

OTHER PUBLICATIONS

Aerators, Inc. Bulletin No. 461 entitled "Aqua–Lator® DDM Direct Drive Mixers" (1991).

*Primary Examiner*—Tony G. Soohoo
*Attorney, Agent, or Firm*—Leydig, Voit & Mayer, Ltd.

[57] ABSTRACT

A floating mixer which is suitable for use in anoxic processes in wastewater treatment facilities is provided. The mixer includes a float and a motor having an elongated shaft which is carried on the float such that the shaft extends into the body of liquid. A motor base is also carried by the float and it supports a shaft enclosure which surrounds and protects the shaft. When the mixer is floating in a body of liquid, the upper end of the shaft enclosure is in communication with the atmosphere above the surface of the body of liquid and the lower end of the shaft enclosure is in communication with the body of liquid. The mixer further includes a propeller attached to the drive shaft below the surface of the liquid which, when driven by the motor, creates a low pressure zone which extends to the lower end of the shaft enclosure. In addition, at least one pressure relief aperture is provided in the shaft enclosure which is sized and positioned below the surface of the liquid surface so that the tendency of the low pressure region to draw air into the shaft enclosure is substantially minimized.

20 Claims, 4 Drawing Sheets

FLOATING MIXER

FIELD OF THE INVENTION

This invention generally relates to apparatus for mixing liquids and, more particularly, to floating downflow mixers.

BACKGROUND OF THE INVENTION

Floating mixers are used in municipal and industrial waste water treatment facilities to mix the contents of a body of liquid, such as a pond. A floating mixer primarily consists of a motor with a propeller on the end of its shaft, mounted shaft-down on a float with the propeller in the liquid below the float. Typically, in order to provide for a deflector bearing near the lower end of the shaft and to protect the shaft, it is advantageous to enclose the shaft in a tube which extends from a motor mounting plate above the surface of the liquid to a point below the surface of the liquid. This shaft enclosure, however, provides a pathway for air from the atmosphere above the surface of the body of liquid to be drawn into the body of liquid being mixed.

Specifically, when the mixer is in operation, the propeller rotates at a relatively high speed and causes liquid to flow rapidly past the opening between the shaft and the end of the shaft enclosure, thereby creating a negative pressure or suction force at the base of the shaft enclosure. If the upper end of the shaft enclosure is in communication with the outside atmosphere, this low pressure region, sometimes referred to herein as a suction force will draw air from the atmosphere through the shaft enclosure and into the body of liquid. The low pressure condition at the back of the propeller which causes the pumping action also contributes to the low pressure region or suction force which tends to draw air through the shaft enclosure.

Within a wastewater treatment facility, floating mixers are used for a variety of different applications including equalization, neutralization, oxygen transfer enhancement, and sequencing batch reactors (SBR's). Some of these applications include processes that must take place without any appreciable amount of oxygen being present in the wastewater. These processes and the areas in which they operate are generally referred to as anoxic processes or zones. There should be no net oxygen gain and, therefore, very little, if any, oxygen transfer into these anoxic zones. Thus, the mixers which are used in these anoxic or anaerobic processes should not draw any appreciable amounts of air into the body of liquid being mixed.

Providing a floating mixer with the capability of stopping air from being drawn into the liquid being mixed has heretofore added an element of complexity and expense. Typically such mixers are more expensive to manufacture and to maintain. For example, the floating mixer described in U.S. Pat. No. 3,856,272 utilizes a series of conduits which run through the body of the float, in order to relieve the negative pressure applied on the liquid within the float passage by the downward pumping action of the mixer. However, providing conduits in the body of the float significantly increases the cost of manufacturing the float. Moreover, the conduits can be an additional path by which air can be drawn into the liquid being mixed, since it can be difficult to ensure that the conduits remain below the surface of the liquid, particularly when the body of liquid is somewhat choppy.

Another solution to the problem of stopping the ingestion of air into the body of liquid being mixed is disclosed in U.S. Pat. No. 4,422,771. This patent discloses using an air tight seal at the upper end of the shaft enclosure so that the shaft enclosure cannot communicate with the outside atmosphere. This air tight seal, however, adds several additional components to the mixer thereby adding to its cost. Moreover, the air tight seal requires regular maintenance, including greasing, in order to maintain its effectiveness.

OBJECTS AND SUMMARY OF THE INVENTION

Accordingly, in view of the foregoing, it is a general object of the present invention to provide a floating mixer which will be accepted by the wastewater treatment industry as appropriate for use in anoxic or anaerobic processes.

Another object of the present invention is to provide a floating mixer for use in anoxic processes which is simple to manufacture and highly reliable.

A related object of the present invention is to provide a floating mixer for use in anoxic processes which does not require any extra components that increase either the material or manufacturing cost of the mixer.

The mixer of the present invention has utility in non-anoxic applications as well, and in that respect it is an object to provide a mixer having an enclosed shaft supported on a conventional float which blocks air flow through the shaft enclosure but without the need for complex and expensive mechanical shaft seals.

Stated even more broadly, an object of the present invention is to provide a mixer having an enclosed shaft supported on a conventional float which has a mechanism to block air flow through the shaft enclosure which requires no regular maintenance or lubrication and has no wearing parts.

In practicing the invention, there is provided a floating mixer which can be used in wastewater treatment applications in general including those involving anoxic or anaerobic processes, and is both highly reliable and simple to manufacture. The floating mixer includes a float which buoyantly supports the mixer on the surface of a body of liquid. A motor having an elongated shaft is mounted on the float such the shaft extends through a passage in the float and into the body of liquid.

In order to provide a base for the mounting of the motor and protection for the drive shaft, the mixer includes a motor base assembly. The motor base assembly includes a shaft enclosure which surrounds the shaft and extends from an upper end located above the surface of the liquid to a lower region having an open end located below the surface of the body of liquid. An intermediate region located between the two ends of the shaft enclosure is intended to operate at the surface of the liquid, sometimes referred to herein as the water line, when the unit floats on the body of liquid. Thus, the upper end of the shaft enclosure is in communication with the atmosphere located above the surface of the body of liquid and the lower end is in communication with the body of liquid.

When the mixer is in operation, the rotation of the propeller causes a low pressure condition at the suction side of the propeller and a rapid flow of water past the lower end of the shaft enclosure, thereby creating a low pressure region or zone, sometimes called a suction force, at the submerged opening of the shaft enclosure. In order to relieve this suction force, which would otherwise tend to draw air from the atmosphere into the shaft enclosure and thereby into the body of liquid, the shaft enclosure includes at least one, and preferably several, pressure relief apertures located below the intermediate region, so that in use the apertures are submerged. In operation, liquid is drawn into the shaft enclosure via the pressure relief apertures to relieve the suction force acting on the lower end of shaft enclosure which would otherwise tend to draw air into the upper end of the shaft enclosure. The pressure relief apertures provide a simple and reliable means to relieve the suction force on the shaft enclosure without requiring that any additional components or parts be added to the mixer.

The size and positioning of the apertures depends in some measure on the physical characteristics of the mixer and the application in which it is to be used. For example, a particular mixer will have a flow past the open submerged end of the shaft support which will create a venturi effect which will vary depending on the size of the gap and the flow rate. Moreover, the operation of the propeller will create a low pressure condition at the propeller which will vary depending on the size of the unit (i.e. the horsepower of the unit). The pressure relief apertures should be sized to relieve the maximum pressure expected from the low pressure region caused by the venturi effect and the low pressure condition at the propeller. In addition, the pressure relief apertures should be located on the shaft enclosure so that they will be below the surface of the body of liquid or water line in all operating conditions. Sometimes mixers will rock during operation as a result of turbulence at the surface of the liquid, however, the relief apertures are located in the shaft enclosure in the center region of the mixer where the majority of the weight of the mixer is concentrated. This minimizes the variation of the water line in this central region even when the mixer is rocking. The positioning of the pressure relief apertures should also take into account the fact that a downflow mixer will rise slightly in the water when it is in operation.

Furthermore, the apertures should be positioned a sufficient distance below the water line so that flow through the pressure relief apertures does not create a further venturi and a further low pressure zone which draws air from the atmosphere. In other words, the pressure differential between the apertures and the open upper end of the shaft enclosure should be close to zero. For that reason the pressure relief apertures should be located as high as practical on the shaft support tube, without introducing the possibility of the pressure relief apertures becoming partially non-submerged during mixer operation. The size of the pressure relief apertures should allow a sufficient quantity of flow without creating significant pressure drops through the apertures which would tend to create a pressure differential between the pressure relief apertures and to the end of the shaft support tube which is open to the atmosphere. This will minimize any secondary air ingestion which might be caused by the mechanism intended to prevent or limit air ingestion in the first place.

These and other features and advantages of the invention will be more readily apparent upon reading the following description of a preferred exemplary embodiment of the invention and upon reference to the accompanying drawings wherein:

BRIEF DESCRIPTION OF THE DRAWINGS

FIG. 2 is a partially cut away side elevation view of the downflow mixer of FIG. 1 showing the elongated shaft, the motor base assembly and the shaft enclosure;

While the invention will be described and disclosed in connection with certain preferred embodiments and procedures, it is not intended to limit the invention to those specific embodiments. Rather it is intended to cover all such alternative embodiments and modifications as fall within the spirit and scope of the invention as defined by the appended claims.

DETAILED DESCRIPTION OF THE PREFERRED EMBODIMENT

Figure 1:
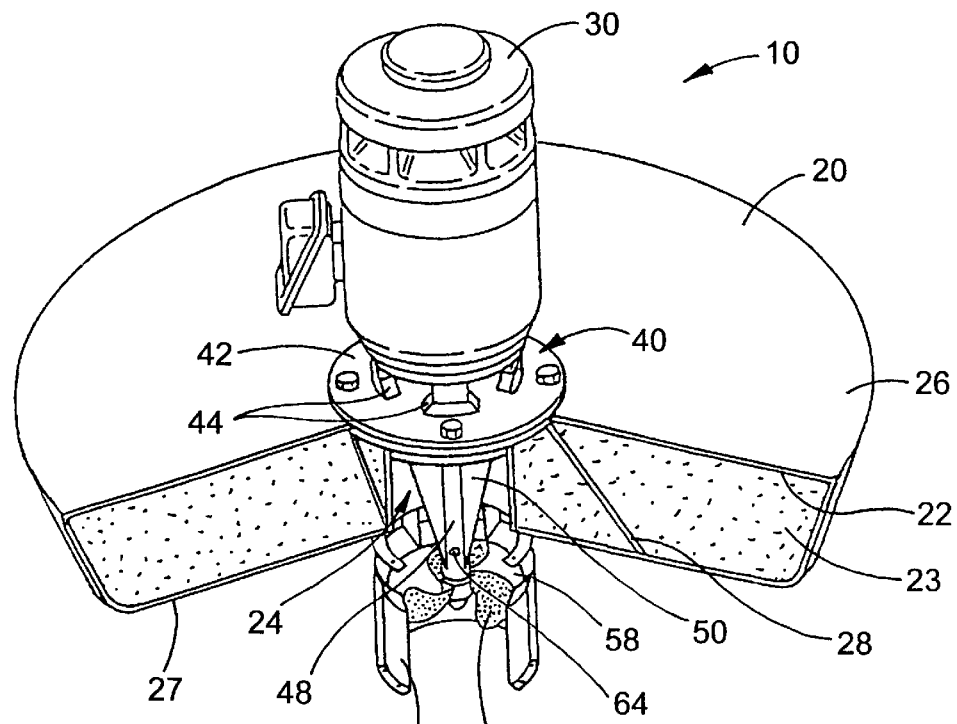
FIG. 1 is a partially cut away perspective view of a downflow mixer constructed in accordance with the teachings of the present invention.

Referring now to the drawings, FIG. 1 shows a floating mixer 10 constructed in accordance with the teachings of the present invention. The mixer 10 may be used in a body of liquid such as a pond, canal, lake, pool, tank, basin or the like in order to mix or agitate the liquid. The mixing or agitation provided by the mixer can serve a variety of different purposes including, for example, helping keep solid materials in the body of liquid in suspension and circulating the liquid in order to enhance the oxygen transfer provided by mechanical aeration equipment. Moreover, the mixer of the present invention is particularly suited for a variety of applications in the waste water treatment industry including those applications which involve anoxic processes.

In order to buoyantly support the mixer 10 in a body of liquid, the mixer includes a float 20. As best shown in FIG. 1, the float 20 comprises an outer shell 22 that is filled with a foam material 23 which adds structural stability to the float and eliminates the possibility that the mixer 10 will sink if the outer shell 22 of the float is damaged. The float 20 also includes a generally cylindrical central opening or passage 24 which extends from the upper surface 26 of the float to the lower surface 27 of the float. Preferably, the outer shell 22 is constructed from stainless steel, fiberglass reinforced plastic or some other material which is suitable for use in wastewater treatment facilities. The foam material 23 is typically a closed-cell polyurethane foam. Struts 28 may be provided inside the float shell 22 in order to further enhance the stability of the float 20. In addition, as shown in FIG. 2, mooring ears 29 can be provided about the outer periphery of the float. Mooring cables (not shown) can be connected to the mooring ears 29 in order to moor the mixer 10 in a particular location within a body of liquid.

Figure 3:
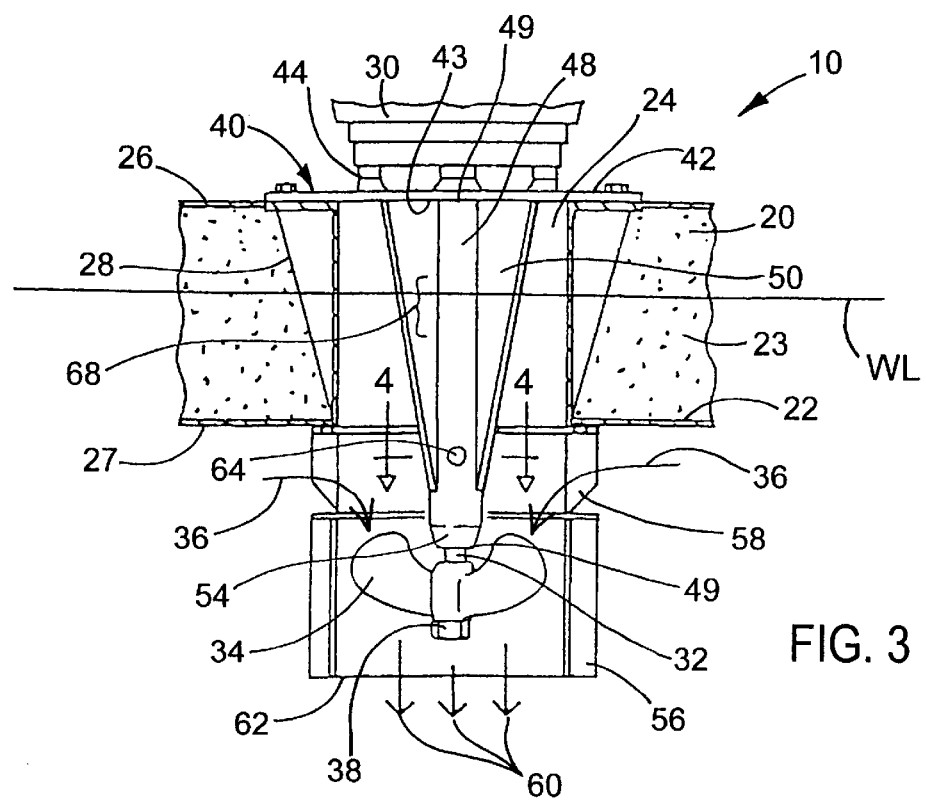
FIG. 3 is an enlarged partially cut away side elevation view of the downflow mixer of FIG. 1 showing the motor base assembly, the shaft enclosure and the pressure relief opening in the shaft enclosure.

The mixer 10 is powered by an electric motor 30 which is arranged in a vertical shaft-down orientation on the upper surface 26 of the float. The motor 30 has a long single piece drive shaft 32 which extends through the central passage 24 in the float to a point below the lower surface 27 of the float such that, when the mixer 10 is placed in a body of liquid, the surface of the body of liquid, which is sometime to referred to herein as the water line, will fall in an intermediate region on the drive shaft 32, and the drive shaft will extend into the liquid being mixed. Likewise, a propeller 34 is attached to the drive shaft 32 at point below the lower surface 27 of the float so that the propeller 34 will be submerged in the liquid being mixed, when the mixer 10 is placed in a pond or the like. FIGS. 2 and 3 indicate the approximate level of the liquid surface or water line WL, i.e. the level of the liquid on the mixer when it is buoyantly supported in a body of liquid. In the illustrated embodiment, the motor 30 operates to rotate the propeller 34 such the liquid being mixed is propelled in the downward direction, away from lower surface 27 of the float as indicated by the arrows 36 in FIGS. 2 and 3. Thus, the illustrated mixer 10 is sometimes referred to as a downflow or downdraft mixer.

In order to attach the propeller 34 to the drive shaft 32, the end of the drive shaft 32 and the propeller 34 are keyed such that they are intermateable. The propeller 34 is secured to the shaft 32 by a nut 38 which engages threads provided on the end of the drive shaft 32. Alternatively, the propeller 34 can be secured to the drive shaft 32 via a pin arrangement (not shown).

In order to provide a base for the mounting of the motor and protection for both the motor 30 and the drive shaft 32, the mixer 10 includes a motor base assembly 40. The motor base assembly 40 includes a generally circular motor base plate 42 which is fastened to the top surface of the float 20 by bolts or other suitable means such that motor base plate 42 substantially covers the central passage 24 in the float. The motor 30 is supported on and bolted to the motor base plate 42 on four blocks 44 which serve to space the motor a short distance above the upper surface of the motor base plate 42 and the float 20. The motor base plate 42 also includes a central opening 46 through which the drive shaft 32 extends.

In order to protect the drive shaft 32, the motor base assembly 40 includes a shaft enclosure 48 which is attached, such as by welding or the like, to the lower surface 43 of the motor base plate. The shaft enclosure surrounds the majority of the length of the portion of the drive shaft 32 which extends through the motor base plate 42. As shown in FIGS. 1 and 2, the shaft enclosure 48 has a substantially cylindrical configuration and extends from the motor base plate 42 to a point below the surface of the liquid near the propeller 34. An intermediate region 68 located between the two ends of the shaft enclosure 48 is intended to operate at the water line WL when the mixer 10 floats on a body of liquid. In order to provide added structural support for the shaft enclosure 48, gussets 50 may be provided which are secured to the shaft enclosure 48 and the motor base plate 42 by welding or the like.

Figure 4:
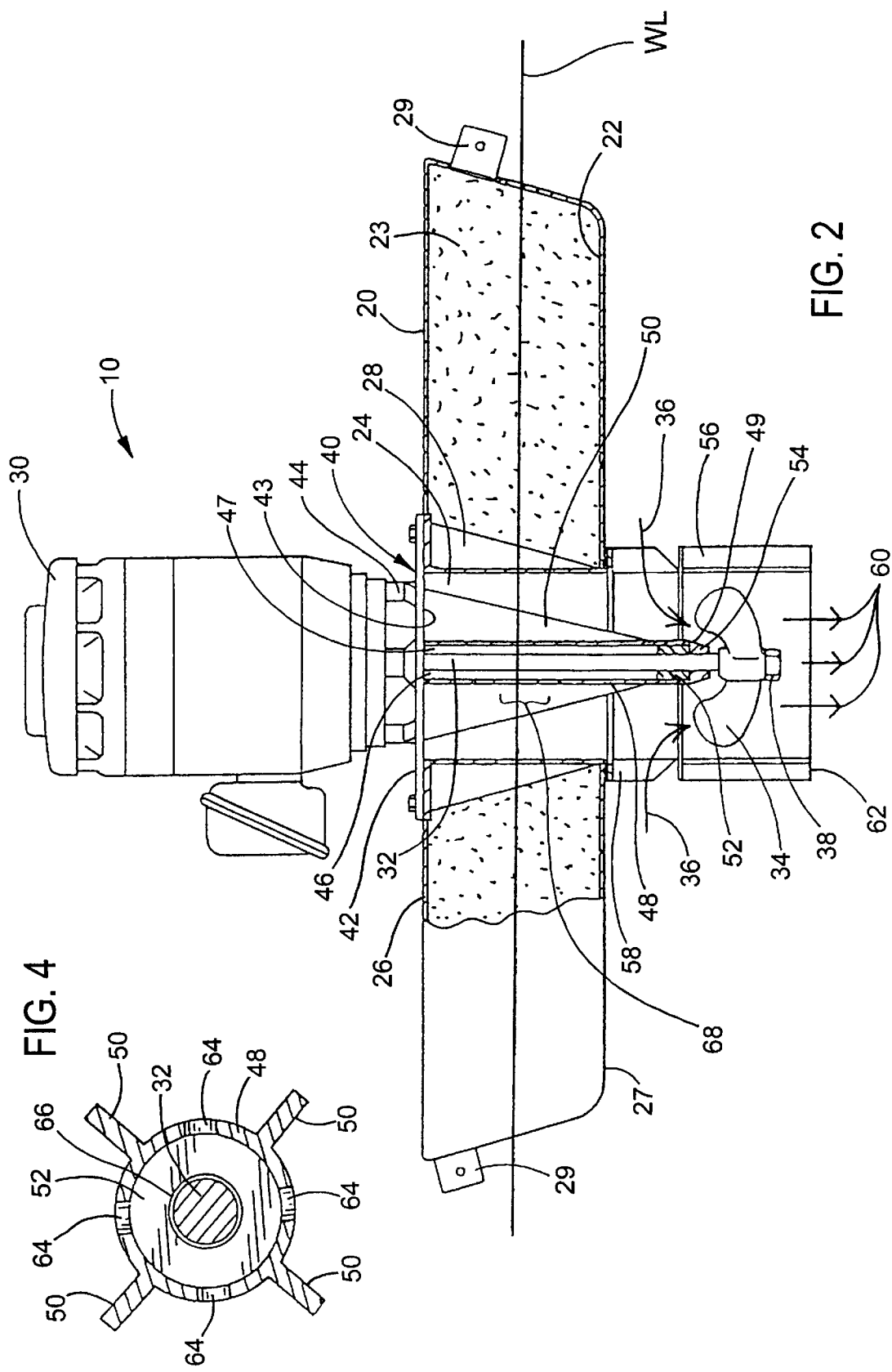
FIG. 4 is a cross sectional view taken along line 4—4 in FIG. 3.

Protection for the drive shaft 32 against excessive deflection caused by objects contacting the propeller 34 is provided by a deflector bearing 52 fixed in the lower end 49 of the shaft enclosure. Since the deflector bearing 52 is only meant to protect against excessive deflection of the drive shaft 32, instead of being in regular contact with the drive shaft, the deflector bearing 52 has a normal running clearance with the drive shaft, as shown in FIGS. 2 and 4. Typically, this running clearance is approximately 0.02 to 0.03 inches. Thus, when a relatively large solid object comes in contact with the propeller 34, the drive shaft 32 will deflect, but only to the point at which it contacts the deflector bearing 52. Preferably, the deflector bearing 52 has a plastic construction which prevents excessive wear on the drive shaft 32 when it comes in contact with the deflector bearing.

Further protection for the shaft is afforded by attaching a debris deflector 54 to the drive shaft 32 below the lower end 49 of the shaft enclosure. The debris deflector 54 is fixed to and rotates with the drive shaft 32. It acts to prevent debris from lodging in the shaft enclosure 48 by slinging it away from the lower end 49 of the shaft enclosure. Since the debris deflector 54 rotates with the drive shaft 32, it must be spaced a short distance below the lower end 49 of the shaft enclosure so that it will not come in contact with the shaft enclosure 48. In the present preferred embodiments, the debris deflector 54 is generally spaced approximately 0.0625 inches below the lower end 49 of the shaft enclosure.

Mechanisms are also provided for protecting the motor 30, particularly in the case where the motor is reversed in order to clear the propeller 34 of debris which might be collected in ordinary operation. When the motor 30 is reversed, the mixer pumps liquid in an upflow direction which tends to drive water up through the shaft enclosure 48 towards the motor bearings. To protect the motor in these situations, conventional mechanisms are provided including a water slinger (not shown) which is mounted on the drive shaft 32 in the small space created by the mounting blocks 44 which support the motor on the motor base plate 42. In addition, it is conventional to provide a lip seal at the upper part of the shaft enclosure 48. The lip seal is oriented so that it effectively blocks any water flow in the upward direction through the shaft enclosure 48 which would be caused by operating the motor in the reverse direction. It is appreciated by those skilled in the art that when the mixer is operated in a normal condition, the lip seal will pass atmospheric air into the shaft enclosure 48 due to the suction forces described herein, and it is the intent of the present invention to block that air flow which is normally passed. In many instances it is also possible to eliminate the lip seal altogether and rely on simply the slinger to protect the motor bearings from water damage. However, since the lip seal and the slinger form no part of the present invention, they will not be further referred to herein.

In order to direct the flow of the liquid as it is being mixed, the mixer 10 includes a discharge volute 56. As shown in FIGS. 1–3, the discharge volute 56 has a generally annular configuration and is attached to the lower surface 27 of the float in alignment with the central passage 24 in the float. The upper end of the discharge volute 56 includes a plurality of intake openings 58 arranged about the outer periphery of the discharge volute such that they are spaced a short distance below the lower surface 27 of the float. When the mixer 10 is operating, the low pressure behind the propeller 34 draws liquid into the discharge volute 56 through the intake openings 58, as indicated by the arrows 36 in FIGS. 2–3, and is then pumped downwardly through the open lower end of the discharge volute as shown by the arrows 60 in FIGS. 2–3.

Since the lower end 49 of the shaft enclosure is positioned near the propeller 34, it is in a zone of low pressure. The low pressure is probably due in part to the pumping action of the propeller and in part to the venturi action of the flow past the gap between the debris defector 54 and the shaft enclosure 48. This pumping action of the propeller and venturi effect caused by the rapid flow of liquid past the narrow gap at the lower end 49 of the shaft enclosure causes a suction force to be applied at the lower end of the shaft enclosure 48 (See FIG. 5). In particular, in order to allow for unimpeded passage of the drive shaft 32, the lower end 49 of the shaft enclosure is open such that it is in communication with the liquid being mixed. Since the debris deflector 54 is spaced a short distance below the lower end 49 of the shaft enclosure, it does not seal off this opening. Since the upper end 47 of the shaft enclosure is open to the outside atmosphere (even with the aforementioned lip seal in place), if this suction force is not relieved, it will tend to draw air from the outside atmosphere into the shaft enclosure 48 because of the pressure difference which is established between the upper and lower ends of the shaft enclosure.

In accordance with an important aspect of the present invention, the shaft enclosure 48 of the mixer includes at least one, and preferably several, pressure relief apertures 64 located below the surface of the liquid which act to relieve the suction force which would otherwise tend to draw air from the outside atmosphere into the shaft enclosure 48. Specifically, instead of drawing air through the shaft enclosure 48, the suction force which results from operation of the mixer 10 will draw liquid into the shaft enclosure via the pressure relief apertures 64. This secondary liquid flow (as opposed to the major primary liquid flow caused by operation of the propeller which causes the mixing) into the apertures 64 and through the shaft enclosure 48 will substantially relieve the suction force which is applied at the lower end 49 of the shaft enclosure. Preferably, the pressure relief apertures 64 are positioned above the deflector bearing 52 and, more particularly, a location roughly midway between the lower end of the deflector bearing 52 and the surface of the body of liquid or water line is presently preferred.

In the illustrated embodiment, the shaft enclosure 48 includes four pressure relief apertures 64 spaced around the periphery of the shaft enclosure. Those skilled in the art will now appreciate that the number and size of the apertures 64 may vary so long as the overall area which is open to the body of liquid by way of the pressure relief apertures is sufficient to offset the suction force which is applied at the lower end 49 of the shaft enclosure. Thus, the important feature of the present invention is one or more apertures for relieving the suction force, and when apertures are referred to herein, it is for sake of convenience, with the intent clearly being to encompass a single aperture capable of performing the function. Multiple apertures are typically considered to be preferred because they can be located at a plurality of points in the shaft enclosure 48 to provide a sufficiently large area for passage of water, but without the possibility of substantially weakening the structure of the shaft enclosure. When smaller flows are adequate, a single aperture may suffice. In one presently preferred embodiment, a twenty-five horsepower mixer is provided with four ¾ inch diameter pressure relief apertures spaced equally about the periphery of the shaft enclosure at a point about 6 inches above the lower end of the shaft enclosure. It has been found that when such a mixer is operated, no appreciable amount of air is drawn into the shaft enclosure from the outside atmosphere. Further, it has been found that the aggregate area of the pressure relief apertures is preferably at least four times the size of the gap between the debris deflector and the lower end of the shaft enclosure.

When the pressure relief apertures 64 are spaced only about 6 inches above the lower end of the shaft enclosure 48, they will typically be below the level of the float 20, and in the path of the major water flow driven by the propeller in its downward pumping action. Locating the pressure relief apertures 64 in this manner is a conservative effort which ensures that the pressure relief apertures are always in the liquid and will almost never project above the liquid surface when the mixer 10 is in operation, even during substantial rocking of the mixer. In many cases it may be possible to position the apertures 64 somewhat higher, for example than shown in FIGS. 2 and 3, while still ensuring that the pressure relief apertures will remain below the water line WL and perform their intended function. In many cases it may be possible to position the apertures 64, as shown for example in FIG. 6, so that they are within the somewhat flow-protected area in the bell formed by the central aperture 24 in the float 20. Thus, referring to FIGS. 2 and 3, it will be seen that the intermediate region 68 about which the water line WL is intended to ride is at a point above the lower surface 27 of the float 10. In most cases the overall weight of the mixer will be such that the water line WL remains relatively stable in this area. In these cases it may be possible to locate the pressure relief apertures 64 so that they are above the lower surface 27 of the float but still reliably also within the liquid, so that the flow of liquid through the lower section of the shaft enclosure 48 is ensured, while providing additional protection for the pressure relief apertures. In particular, the liquid will flow from the supply in the central passage 24 in the float, and the area in which the pressure relief apertures 64 will be found will be much less turbulent, because the major flow caused by the propeller skims the lower surface 27 of the float and then is driven sharply downward as suggested in FIGS. 2, 3 and 5.

Figure 5:
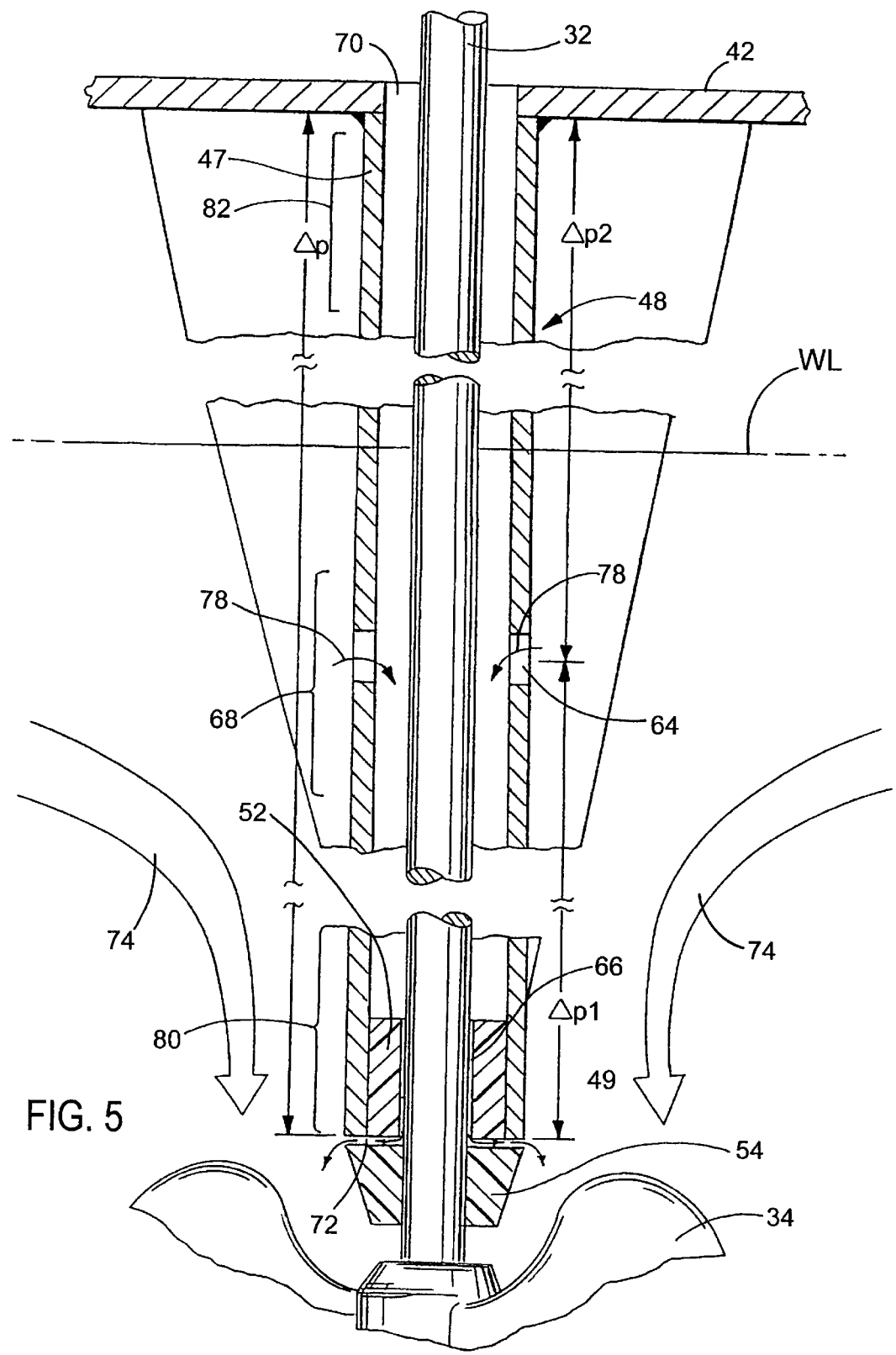
FIG. 5 is a diagrammatic view illustrating pressures and flows in a shaft enclosure constructed in accordance with the present invention.
Figure 6:
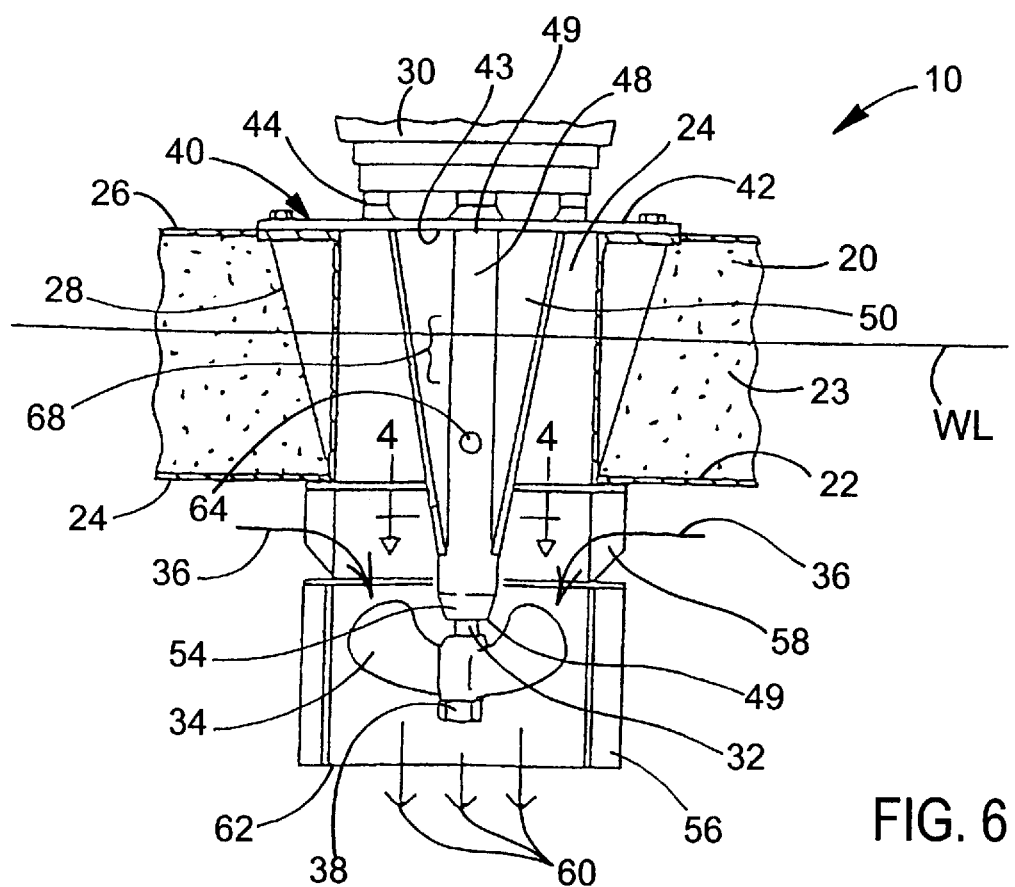
FIG. 6 is an enlarged partially cut away side elevation view showing a pressure relief aperture in an alternative location.

Some of the principles of the present invention will be better understood by reference to FIG. 5. FIG. 5 is a schematic enlarged sectional view of the motor shaft 32 and shaft enclosure 48, showing the pressure relief apertures 64 and the various pressures and flows which tend to affect system operation. The system of FIG. 5 has an opening 70 at the upper end of the shaft enclosure which is available for passage of air to the propeller 34 if drawn in by the operation described thus far.

As shown in FIG. 5 the lower end 49 of the shaft enclosure includes the deflector bearing 52 and the debris deflector 54. A small gap 66 is provided between the shaft and the anti-deflection bearing, and a further gap 72, conventionally about 0.06 inches, between the debris deflector 54 and the lower end 49 of the shaft enclosure and deflector bearing 52. These two gaps 66, 72 leave the lower end of the shaft enclosure open to the liquid such that a suction force in the liquid will be exerted through the shaft enclosure 48 to draw air from the atmosphere by way of the opening 70 at the upper end of the shaft enclosure.

More particularly, the propeller will rotate to cause major liquid flow (usually on the order of thousands of gallons per minute) along the stream suggested by the arrows 74 and create a low pressure zone which includes the lower end of the shaft enclosure. The rotation of the propeller 34 creates a low pressure condition at the backside of the propeller which is the mechanism which causes the pumping flow. In addition, the major flow indicated by the arrows 74 past the gap 72 creates a venturi effect which produces a localized low pressure or suction force located at the gap 72. The exact nature of the low pressure zone caused by operation of the propeller is not clearly understood, but it is believed to result from both the rotation of the propeller and the venturi effect. However, whatever the source of the low pressure zone, it is clear that there is a suction force in the location of the gap 72 that tends to draw air into the shaft enclosure 48 which is then driven along with the water into the mixed flow by the propeller 34. At the left side of the shaft enclosure 48 in FIG. 5 there is shown a A Δ P which exists between the lower 49 and upper 47 ends of the shaft enclosure and which represents the total pressure differential which is typically created.

In accordance with the present invention, that total pressure differential A Δ P is broken into separate components by the introduction of pressure relief apertures 64. It will be seen that the pressure relief apertures 64 in the present invention are provided below the water line WL and allow the flow of liquid (indicated by arrows 78) into the lower region of the shaft enclosure 48, so that the liquid flows from the pressure relief apertures 64 through the gap 66 between the shaft 32 and the deflector bearing 52 and out the gap 72 between the lower end of the shaft enclosure and the debris deflector 54. (It is noted parenthetically that this is the path in the currently illustrated embodiment, however the liquid will flow through whatever gap exists at the lower end of the shaft enclosure.)

Since liquid is available at the pressure relief apertures 64 to flow into the shaft support tube, the pressure differential A Δ P which would have been exerted in the absence of pressure relief apertures is now exerted between the lower end 49 of the shaft enclosure and the pressure relief apertures 64. If the actual pressure differential between the lower end 49 of the shaft enclosure and the apertures 64 (shown as A Δ P1) was measured it probably would be somewhat different, however, it will be found in practice that there is very little air introduced into the shaft enclosure 48, which indicates that whatever suction force that is created by the low pressure zone is relieved by the flow of liquid through the shaft enclosure 48 as suggested by the arrows 78. Thus, a second pressure differential A Δ P2 which would be created between the pressure relief apertures 64 and the upper end 47 of the shaft enclosure is substantially zero. This is evidenced by the fact that there is very little air flow into the shaft enclosure, indicating that there is substantially no mechanism or pressure differential to create that air flow.

The apertures 64 are sized to achieve sufficient liquid flow through the lower region 80 of the shaft enclosure 48, without creating either a pressure drop across the apertures or a venturi effect between the aperture 64 and the upper region 82 of the shaft enclosure which would tend to serve as a mechanism for drawing air into the shaft enclosure 48. Thus, when the mixer 10 is operating, whatever suction pressure that is created in the low pressure region is relieved by flow into the pressure relief apertures 64 and through the lower region 80 of the shaft enclosure, in such a way as to relieve any tendency to draw air into the upper portion of the shaft enclosure. Moreover, preferably, the pressure relief apertures are positioned so that they are substantially outside of the low pressure zone created by operation of the propeller so that there will be no suction force at the apertures which would tend to draw air into the upper end of the shaft enclosure.

The mechanism will thus be understood to be both functional and highly reliable. If the apertures are positioned so that they are reliably below the surface of the liquid, they will function to pass liquid through the lower region of the shaft enclosure whenever the unit is operating. Selecting the appropriate size for the apertures will assure that the flow rates are such that the passages will not block. In particular situations the apertures can be positioned in the region below the water line but above the bottom surface of the float, so that they are out of the region of major flow, thereby providing an additional measure of protection. In other cases it may be desirable to keep the apertures in the region of major flow below the lower surface of the float. In any case, however, utilizing the principles taught herein, it will be a matter of simple design and subsequent operational checkout to ensure that the necessary mechanism is in place to both relieve the pressure at the lower end of the shaft enclosure and thereby avoid the tendency to ingest air through the upper portion of the shaft enclosure.

The use of pressure relief apertures to relieve the suction force applied on the shaft enclosure provides a simple, yet very reliable, way to keep appreciable amounts of air from being drawn into the body of liquid via the shaft enclosure. Moreover, the pressure relief apertures add very little to the cost of manufacturing a downflow mixer.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and the scope of the invention as defined by the following claims.

What is claimed is:

1. A floating mixer for use in a body of liquid comprising:
   a float having a central passage therethrough and defining a water line when the mixer is floating in a body of liquid,
   a motor carried by the float and having an elongated drive shaft which extends through the central passage in the float and below the water line,
   a motor base carried by the float and supporting a shaft enclosure which surrounds the shaft and extends from an upper end at the motor base through an intermediate region at the water line to a lower region having an open end through which the drive shaft projects,
   a propeller attached to the drive shaft below the water line such that when the motor drives the propeller a low pressure zone is created which extends to the open end of the shaft enclosure, and
   at least one pressure relief aperture in the shaft enclosure positioned below the water line so that the low pressure zone causes liquid flow through the pressure relief aperture and the lower region of the shaft enclosure which eliminates any substantial pressure differential which would tend to draw air through the upper end of the shaft enclosure into the low pressure zone.

2. The floating mixer of claim 1 further including a deflector bearing positioned in the shaft enclosure near the lower end thereof such that there is a gap between the deflector bearing and the drive shaft and wherein the pressure relief aperture is located above the deflector bearing.

3. The floating mixer of claim 1 wherein the pressure relief aperture is located approximately midway between the water line and the lower end of the shaft enclosure.

4. The floating mixer of claim 1 wherein the float has a lower surface and the pressure relief aperture is positioned above the lower surface of the float in the central passage.

5. The floating mixer of claim 1 wherein the float has a lower surface and the pressure relief aperture is positioned below the lower surface of the float.

6. The floating mixer of claim 1 wherein the pressure relief aperture is sized to pass sufficient liquid flow to relieve the pressure differential without drawing a substantial amount of air through the upper end of the shaft enclosure.

7. The floating mixer of claim 1 wherein the shaft enclosure includes a plurality of pressure relief apertures.

8. The floating mixer of claim 7 wherein the plurality of pressure relief apertures are spaced substantially equidistant from each other about the periphery of the shaft enclosure.

9. The floating mixer of claim 7 wherein the plurality of pressure relief apertures are sized to pass sufficient liquid flow to relieve the pressure differential without drawing a substantial amount of air through the upper end of the shaft enclosure.

10. The floating mixer of claim 9 wherein the area of the plurality of pressure relief apertures is at least four times the size of the opening at the lower end of the shaft enclosure.

11. The floating mixer of claim 7 wherein the float has a lower surface and the plurality of pressure relief apertures are positioned above the lower surface of the float in the central passage.

12. The floating mixer of claim 7 wherein the float has a lower surface and the plurality of pressure relief apertures are positioned below the lower surface of the float.

13. The floating mixer of claim 7 wherein the float has a lower surface and at least one pressure relief aperture is positioned above the lower surface of the float in the central passage and at least one pressure relief aperture is positioned below the lower surface of the float.

14. The floating mixer of claim 1 wherein the shaft enclosure extends along the motor shaft to a position adjacent the propeller, such that a low pressure pumping force produced by rotation of the propeller creates said low pressure zone.

15. The floating mixer of claim 14 wherein the drive shaft projects through the shaft enclosure in such a way to create a gap at the open end of the shaft enclosure in the path of liquid flow, liquid flows past the gap serving to produce a venturi effect which contributes to said low pressure zone.

16. The floating mixer of claim 1 wherein the drive shaft projects through the shaft enclosure in such a way to create a gap at the open end of the shaft enclosure in the path of liquid flow, liquid flows past the gap serving to produce a venturi effect and wherein said low pressure zone is caused by said venturi effect.

17. The floating mixer of claim 1 wherein the pressure relief aperture is positioned substantially outside of the low pressure zone.

18. A floating downflow mixer for use in a body of liquid comprising:
   a float,
   a motor carried by the float and having an elongated shaft which extends into the liquid when the mixer is floating in a body of liquid,
   a shaft enclosure surrounding the shaft which when the mixer is floating in a body of liquid has an upper end in communication with the atmosphere and a lower end in communication with the body of liquid and with the water line falling between the upper and lower end,
   a propeller attached to the shaft which when driven creates a low pressure zone which includes the lower end of the shaft enclosure and causes a suction force at the lower end of the shaft enclosure, and
   at least one pressure relief aperture in the shaft enclosure below the water line and substantially outside of the low pressure zone to allow the low pressure zone to draw liquid through the aperture and relieve substantially any tendency to draw air into the upper end of the shaft enclosure.

19. The floating mixer of claim 18 wherein the pressure relief aperture is sized to pass sufficient liquid flow to relieve the suction force without drawing a substantial amount of air through the upper end of the shaft enclosure.

20. A method for preventing air flow through a shaft enclosure of a floating downflow mixer, wherein the shaft enclosure surrounds and protects a shaft of a motor which extends through the shaft enclosure to support a propeller at the lower end thereof in the body of liquid, wherein the shaft enclosure has an upper end in communication with the atmosphere and a lower region in the body of liquid which has an open end through which the shaft passes, the method comprising the steps of:
   driving the propeller with the motor to create a primary flow of liquid to mix the liquid and incidentally causing a low pressure region which extends to the lower end of the shaft enclosure,
   creating a secondary flow of water through the lower portion of the shaft enclosure by way of at least one aperture sized and positioned below the liquid surface such that the secondary flow is continuous when the propeller is being driven, and
   maintaining the secondary flow at a level which minimizes a tendency of the low pressure region to draw air into the enclosure.

* * * * *